US012560279B2

(12) United States Patent
Yu et al.

(10) Patent No.: US 12,560,279 B2
(45) Date of Patent: Feb. 24, 2026

(54) AUTOMATIC GREASE INJECTION SYSTEM AND EXPLOITATION SYSTEM

(71) Applicant: Yantai Jereh Petroleum Equipment & Technologies Co., Ltd., Shandong (CN)

(72) Inventors: Wenyang Yu, Yantai (CN); Bai Lin, Yantai (CN); Dejian Bao, Yantai (CN); Guoling Ju, Yantai (CN); Shulin Zhang, Yantai (CN); Jixin Wang, Yantai (CN); Liang Lv, Yantai (CN); Jianwei Wang, Yantai (CN); Weiwei Liu, Shandong (CN); Jinling Huang, Yantai (CN)

(73) Assignee: YANTAI JEREH PETROLEUM EQUIPMENT & TECHNOLOGIES CO., LTD., Yantai (CN)

( * ) Notice: Subject to any disclaimer, the term of this patent is extended or adjusted under 35 U.S.C. 154(b) by 112 days.

(21) Appl. No.: 18/291,605

(22) PCT Filed: May 25, 2022

(86) PCT No.: PCT/CN2022/094990
§ 371 (c)(1),
(2) Date: Jan. 24, 2024

(87) PCT Pub. No.: WO2023/206680
PCT Pub. Date: Nov. 2, 2023

(65) Prior Publication Data
US 2024/0377026 A1    Nov. 14, 2024

(30) Foreign Application Priority Data
Apr. 29, 2022    (CN) .......................... 202210476119.0

(51) Int. Cl.
*F16N 21/00*        (2006.01)

(52) U.S. Cl.
CPC .......... *F16N 21/00* (2013.01); *F16N 2250/40* (2013.01); *F16N 2270/70* (2013.01)

(58) Field of Classification Search
CPC .. E21B 43/2607; F16N 21/00; F16N 2250/40; F16N 2270/70
See application file for complete search history.

(56) References Cited

U.S. PATENT DOCUMENTS 2,845,142 A * 7/1958 Schneller ................ B60R 17/02
                                                    184/7.4
RE27,745 E * 8/1973 Brooks ................. E21B 43/017
                                                    166/356
(Continued)

FOREIGN PATENT DOCUMENTS

CN        201818990 U     5/2011
CN        202937992 U     5/2013
(Continued)

OTHER PUBLICATIONS

International Search Report and Written Opinion mailed on Dec. 15, 2022, received for PCT Application PCT/CN2022/094990, filed on May 25, 2022, 11 pages including English Translation.

*Primary Examiner* — Shane Bomar
(74) *Attorney, Agent, or Firm* — XSENSUS LLP

(57)        ABSTRACT
An automatic grease injection system comprises a host module, a shunting module and a control module; the host module comprises a power device and a grease injection device, in which the power device drives the grease injection device to output sealing grease; the shunting module comprises a control valve and a connecting pipeline, the connecting pipeline comprises a plurality of shunting branch pipes and a grease injection main pipe which are connected to each other, in which the grease injection main pipe is connected to the grease injection device, and each of the shunting branch pipes is connected to a device to be injected
(Continued)

with grease, and sealing grease output by the host module is selectively connected to the device to be injected with grease through the shunting module; the control module is to output control signals to the host module and the shunting module.

18 Claims, 5 Drawing Sheets

(56)                    References Cited

U.S. PATENT DOCUMENTS

| | | | | |
|---|---|---|---|---|
| 11,236,739 | B2 * | 2/2022 | Yeung | F16N 19/006 |
| 11,988,329 | B1 * | 5/2024 | Horvath | E21B 43/2607 |
| 12,000,240 | B2 * | 6/2024 | Cain | E21B 43/2607 |
| 12,221,846 | B1 * | 2/2025 | Beard | E21B 34/02 |
| 2014/0166268 | A1 * | 6/2014 | Weightman | E21B 33/13 |
| | | | | 166/250.01 |
| 2019/0360636 | A1 * | 11/2019 | McKim | F16N 29/04 |
| 2020/0017130 | A1 * | 1/2020 | Pieper | B61K 3/00 |
| 2020/0248529 | A1 * | 8/2020 | Beason | E21B 43/2607 |
| 2020/0332954 | A1 * | 10/2020 | Babineaux | E21B 41/00 |
| 2020/0347990 | A1 * | 11/2020 | McKim | F16N 25/00 |
| 2021/0262315 | A1 * | 8/2021 | Beason | E21B 33/068 |
| 2021/0352816 | A1 * | 11/2021 | Deshpande | G01F 15/14 |
| 2022/0186583 | A1 * | 6/2022 | Cain | F16N 13/22 |
| 2022/0290547 | A1 * | 9/2022 | Viator | F16N 13/22 |
| 2022/0316307 | A1 * | 10/2022 | Curry | E21B 41/00 |
| 2023/0142640 | A1 * | 5/2023 | Duerinckx | F16N 29/04 |
| | | | | 184/105.3 |
| 2025/0067395 | A1 * | 2/2025 | Hall | F16N 29/02 |
| 2025/0207722 | A1 * | 6/2025 | Lee | F16N 5/00 |

FOREIGN PATENT DOCUMENTS

| | | |
|---|---|---|
| CN | 105289928 A | 2/2016 |
| CN | 206875101 U | 1/2018 |
| CN | 208831390 U | 5/2019 |
| CN | 212131988 U | 12/2020 |
| CN | 212359767 U | 1/2021 |
| CN | 213450391 U | 6/2021 |
| CN | 213627511 U | 7/2021 |
| CN | 113586925 A | 11/2021 |
| CN | 113751290 A | 12/2021 |
| CN | 215259141 U | 12/2021 |
| KR | 10-2020-0013292 A | 2/2020 |

* cited by examiner

AUTOMATIC GREASE INJECTION SYSTEM AND EXPLOITATION SYSTEM

CROSS-REFERENCE TO RELATED APPLICATIONS

The present disclosure is based on PCT filing PCT/CN2022/094990, filed May 25, 2022, which claims priority from Chinese Patent Application No. 202210476119.0, filed Apr. 29, 2022, the contents of each are incorporated herein by reference.

FIELD

The disclosure relates to the technical field of petroleum and natural gas exploitation, in particular to an automatic grease injection system and an exploitation system.

BACKGROUND

After a period of operation, high-pressure fluid flowing at high speed in a device used in processes of exploitation, fracturing, drilling, cementing, flowback, and the like of a general well site will lead to loss of some sealing grease, so it is necessary to supplement grease to the device, which may contribute to sealing assistance, lubrication, sand accumulating prevention, and the like of the device. However, grease can only be manually injected into a single device in turn with a general grease injection tool. The grease injection tool which generally uses compressed air as a power source and is separately provided with an air source device with low output pressure, small displacement, low grease injection efficiency and long grease injection time. As the device to be injected with grease is located in different positions, the grease injection tool needs to be moved constantly, but the injection tool is heavy and inconvenient to move, which greatly affects an operation progress in a well site and greatly limits increase of production and efficiency of the well site. In addition, a grease injection tool generally does not display flow, so a grease injection amount of a device cannot be confirmed: during grease injection, an operator needs to inject grease beside the grease injection tool during the whole process, and if pressure in the well fluctuates at this time, there will be certain potential safety hazards: besides, during the grease injection process, sealing grease is easy to flow out, causing environmental pollution.

In general grease injection in a well site, it is necessary to pour sealing grease into a grease injection pump barrel and then inject grease, and the process of pouring consumes time and labor: the grease injection tool can only inject grease into one device alone and has low output pressure, small displacement, long grease injection time and low grease injection efficiency: after grease injection of one device, it is necessary to move the grease injection tool and then inject grease into the next device, which is extremely inconvenient, greatly prolongs maintenance time, and affects an on-site operation progress: during grease injection, it is necessary for an operator to control the grease injection tool based on an actual situation of grease injection, and since the device is in a non-safe area, if pressure fluctuates in the well during this process, there will be certain potential safety hazards.

SUMMARY

In order to solve the technical problem of low grease injection efficiency and inconvenient operation of an automatic grease injection system in the related art, a main purpose of the disclosure is to provide an automatic grease injection system and an exploitation system with high grease injection efficiency and convenient operation.

In a first aspect, the disclosure provides an automatic grease injection system comprising a host module, a shunting module and a control module: the host module comprises a power device and a grease injection device, in which the power device drives the grease injection device to output sealing grease: the shunting module comprises a control valve and a connecting pipeline, the connecting pipeline comprises a plurality of shunting branch pipes and a grease injection main pipe which are connected to each other, in which the grease injection main pipe is connected to the grease injection device, and each of the shunting branch pipes is connected to a device to be injected with grease, and sealing grease output by the host module is selectively connected to the device to be injected with grease through the shunting module: the control module is signally connected to the host module and the shunting module to receive state signals of the host module and the shunting module and to output control signals to the host module and the shunting module.

Compared with the related art, the automatic grease injection system in the disclosure supplies sealing grease by the host module and collects working data of the host module by the control module. Moreover, the control module can control the host module to run automatically based on a preset mode, so that automatic grease injection can be realized based on a preset time node, a grease injection pressure node or other control nodes which can be automatically acquired.

Furthermore, in this embodiment, the host module is an integrated host and is connected with a plurality of the devices to be injected with grease through a plurality of the shunting modules, that is, the sealing grease supplied by the host module is first remotely transported to one or more shunting modules through the grease injection main pipe, and then the shunting branch pipe is led out from the shunting modules, so as to be connected to each of the devices to be injected with grease. In this way, the host module can be installed in a safe area away from the wellhead, which has higher safety for the device or operator, and since the host module is away from the wellhead, the total number of devices near the wellhead can be reduced.

In some embodiments, the host module further comprises a flow control device to detect fluid flow of components in the host module and the shunting module and to control fluid flow of the grease injection main pipe and each of the shunting branch pipes; and/or, the host module further comprises an overpressure protection device which is connected to fluid passages of the components in the host module and the shunting module: the overpressure protection device performs automatic pressure relief according to a signal exceeding a threshold pressure in the fluid passage; and/or, the host module further comprises an emergency cut-off device which is connected to the components in the host module and/or the shunting module; the emergency cut-off device turns off all or part of the components in the host module according to a preset abnormal signal, and/or the emergency cut-off device turns off all or part of the components in the shunting module according to a preset abnormal signal.

In some embodiments, the shunting module further comprises a multi-way coupling and a plurality of shunting control valves, the multi-way coupling comprises a main pipe coupling and a plurality of branch pipe couplings, wherein the main pipe coupling is connected to the grease injection main pipe, and a plurality of the branch pipe couplings are connected to the shunting branch pipes: a plurality of the shunting control valves are respectively disposed on the shunting branch pipes to respectively control a flux of the shunting branch pipes.

In some embodiments, the shunting module further comprises a plurality of reels configured to respectively receive and release the shunting branch pipes, and each of the shunting branch pipes further comprises a quick coupling which is assembled to a grease injection valve of the device to be injected with grease.

In some embodiments, each of the shunting branch pipes is provide with an explosion-proof flowmeter, and the grease injection main pipe is also provided with an explosion-proof flowmeter, so as to transport fluid flow in a corresponding pipeline to the control module.

In some embodiments, the grease injection device comprises: a grease injection pump configured to pump sealing grease into the grease injection main pipe; a booster pump configured to supply pressurized hydraulic oil to the grease injection pressurization device; and a grease injection pressurization device configured to perform grease injection pressurization with the pressurized hydraulic oil as a power source.

In some embodiments, the host module comprises a control hydraulic source, a plurality of control valve groups and a plurality of hydraulic valves; a plurality of the control valve groups are all connected to the control hydraulic source and output a plurality of control hydraulic pipes, a plurality of the control hydraulic pipes are respectively connected to the hydraulic valves, and the control valve groups respectively control the hydraulic valves connected thereto: a plurality of the hydraulic valves are respectively disposed in the grease injection main pipe and a plurality of the shunting branch pipes, and a plurality of the hydraulic valves control a flux of the grease injection main pipe and a plurality of the shunting branch pipes.

In some embodiments, the overpressure protection device comprises a plurality of pressure relief valves, each of which is connected to a grease injection pipeline in each of the shunting modules and automatically releases pressure according to a signal exceeding a threshold pressure in the pipeline.

In some embodiments, the shunting module further comprises a plurality of high-pressure sealing grease distribution valves, and a grease injection valve of the device to be injected with grease adopts grease injection at two sides separately, and the high-pressure sealing grease distribution valve controls switching of conduction between the shunting branch pipe and grease injection points at two sides of the grease injection valve.

In a second aspect, the disclosure relates to an automatic grease injection system comprising a hydraulic power source assembly configured to output grease injection power hydraulic oil and a plurality of grease injection devices: the hydraulic power source assembly drives a plurality of the grease injection devices to separately output sealing grease: the control module is signally connected to the hydraulic power source assembly and a plurality of the grease injection devices to receive state signals of the hydraulic power source assembly and a plurality of the grease injection devices and to output control signals to the hydraulic power source assembly and a plurality of the grease injection devices.

In some embodiments, the automatic grease injection system and a fracturing manifold form a skid together, and a plurality of the grease injection devices are butted against a plurality of devices to be injected with grease on the fracturing manifold respectively.

In some embodiments, the fracturing manifold comprises a low-pressure manifold and a high-pressure manifold, both of which are installed on a skid frame assembly through a support, and the low-pressure manifold is configured to transport low-pressure fracturing fluid to a suction end of a fracturing pump truck: the in high-pressure manifold is configured to control high-pressure fracturing fluid.

In some embodiments, the control module is installed on the skid frame assembly and integrated with a control unit of the fracturing manifold.

In a third aspect, the disclosure relates to an exploitation system comprising the automatic grease injection system.

Compared with the related art, the disclosure has the following beneficial effects: provided is a remote automatic grease injection module system capable of realizing quick connection, which is mainly composed of three modules: the host module, the shunting module, and the control module, and can realize modular assembly. The host module can output high-pressure and large-displacement sealing grease through the grease injection device and the power device, and can realize functions of flow monitoring, overpressure protection, emergency cut-off and the like of the sealing grease: wherein the grease injection device may be a one-stage grease injection pump, a two-stage grease injection pump or even a multi-stage grease injection pump, and the grease injection pump may be a pneumatic grease injection pump, a hydraulic grease injection pump, an electric grease injection pump and the like, all of which can output the high-pressure and large-displacement sealing grease. The shunting module comprises a reel, various coupling switches, electromagnetic valves, and the like. A plurality of shunting modules are disposed based on different well site layout and different device number, and each of the shunting modules can be provided with a plurality of oil outlets to quickly inject grease into different devices respectively: each of the shunting modules can be freely assembled with other shunting modules and the host module or can be used alone: a connection means of each oil outlet is a quick connection device, which can realize quick connection and disassembly with a device. The control module can realize quantitative automatic grease injection and remote wired or wireless control depending upon device situations at site.

BRIEF DESCRIPTION OF THE DRAWINGS

Accompanying drawings herein, which are incorporated in the description and constitute a part of the description, illustrate embodiments according to the disclosure and serve to explain principles of the disclosure together with the description.

In order to illustrate embodiments of the disclosure or technical solutions in the related art more clearly, drawings that need to be used in description of the embodiments or the related art are briefly introduced below, and it will be apparent to those of ordinary skill in the art that other drawings may be obtained based on these drawings without inventive work.

101. control module;

102. host module; 1021. power device; 1022. grease injection device; 1023. flow control device;

1024. overpressure protection device; 1025. emergency cut-off device;

103. grease injection main pipe; 104. shunting module; 105. shunting branch pipe; 106. device to be injected with grease;

J1. quick coupling (female) body: J10. quick coupling (male) body: J5. quick coupling (female) sealing ring;

J9. quick coupling (male) sealing ring; J7. quick coupling steel ball;

2. low-pressure grease injection pump; 3. filter; 4. hydraulic pump; 5. booster cylinder control valve group; 6. check valve; 7. booster cylinder;

8. stop valve; 9. pressure relief valve; 10. stop valve; 11. explosion-proof flowmeter;

12. safety pressure relief valve;

11. explosion-proof flowmeter; 14. shunting solenoid valve; 15. reel; 16. coupling switch;

20. control solenoid valve group;

301. cross; 302. flanged straight pipe; 303. electric valve; 304. low pressure manifold assembly; 305. skid frame assembly;

306. safety valve assembly: 307. five-port; 308. fracturing head assembly; 309. grease injection system; 310. hydraulic power source assembly; 311. control system assembly;

01. hydraulic power source; 02. booster cylinder control valve; 03. grease injection booster cylinder; 04. sealing grease distribution valve; 05. valve.

DETAILED DESCRIPTION

In order to make objects, technical solutions, and advantages of embodiments of the disclosure clearer, the technical solutions in the embodiments of the disclosure will be clearly and fully described in combination with the accompanying drawings in the embodiments of the disclosure. Obviously, the embodiments to be described are part of embodiments but not all embodiments of the disclosure. Based on the embodiments in the disclosure, all other embodiments obtained by those of ordinary skill in the art without inventive work shall fall within the scope of the disclosure.

In order to solve the technical problem of low grease injection efficiency and inconvenient operation of an automatic grease injection system in the related art, a main purpose of the disclosure is to provide an automatic grease injection system and an exploitation system with high grease injection efficiency and convenient operation. Embodiments of a fuel gas turbine generator set and a mobile power generation device according to the disclosure are described below with reference to the drawings.

Figure 1:
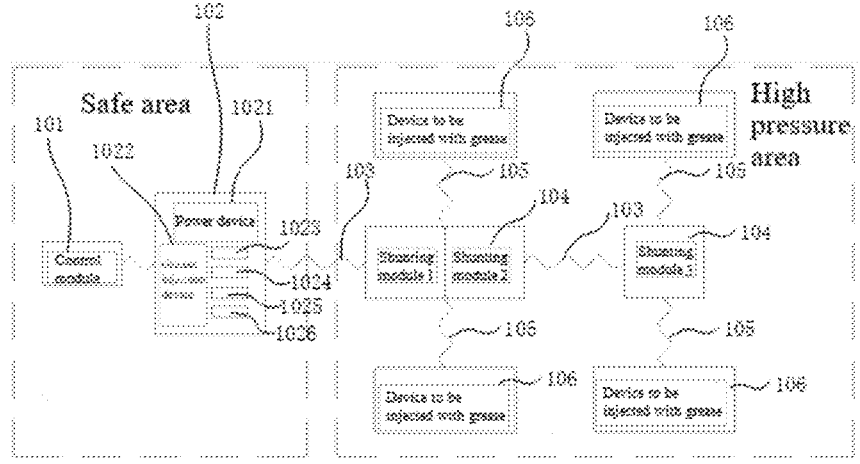
FIG. 1 is a schematic diagram of an overall structure of an automatic grease injection system according to an embodiment of the disclosure.

In a first aspect, FIG. 1 is a schematic diagram of an overall structure of an automatic grease injection system according to an embodiment of the disclosure, which mainly comprises a host module 102, a shunting module 104 and a control module 101: the host module 102 comprises a power device 1021 and a grease injection device 1022, in which the power device 1021 drives the grease injection device 1022 to output sealing grease; the shunting module 104 comprises a control valve and a connecting pipeline, the connecting pipeline comprises a grease injection main pipe 103 and a plurality of shunting branch pipes 105 which are connected to each other, in which the grease injection main pipe 103 is connected to the grease injection device 1022, and each of the shunting branch pipes 105 is connected to the device to be injected with grease 106, and the sealing grease output by the host module 102 is selectively connected to the device to be injected with grease 106 through the shunting module 104; the control module 101 is signally connected to the host module 102 and the shunting module 104 to receive state signals of the host module 102 and the shunting module 104 and output control signals to the host module 102 and the shunting module 104.

Three modules comprise the host module 102, the shunting module 104 and the control module 101, which can realize modular assembly. The host module 102 and the shunting module 104 can form a skid separately. The host module 102 mainly comprises a power device 1021, a grease injection device 1022, a flow control device 1023, an overpressure protection device 1024 and an emergency cut-off device 1025, wherein the power device 1021 may be a pneumatic, hydraulic or electric power source to provide power for a grease filling device 1022: the grease injection device 1022 may be a one-stage grease injection pump, a two-stage grease injection pump or even a multi-stage grease injection pump, that is, high-pressure and high-flow sealing grease can be directly output with the one-stage grease injection pump, or the high-pressure and high-flow sealing grease can be output with the two-stage grease injection pump (a low-pressure grease injection pump inputs the sealing grease into a pressurization system and is turned into high-pressure and high-flow sealing grease through a booster cylinder); the flow control device 1023 can monitor a device grease injection amount in the system, and meanwhile can realize device quantitative grease injection depending on the set grease injection amount; when pressure in the system exceeds a set pressure, the overpressure protection device 1024 automatically relieves pressure to protect safety of the whole pipeline; and when any abnormality occurs in the grease injection process, the grease injection system can be stopped with the emergency cut-off device 1025. Wherein, a plurality of shunting modules 104 may form a skid separately, generally may comprise a plurality of reels, various coupling switches, electromagnetic valves, and the like. A plurality of shunting modules 104 are generally provided simultaneously based on different well site layout and different device number, and each of the shunting modules 104 can be provided with a plurality of oil outlets to quickly inject grease into different devices respectively. The control module 101 can display various signal feedbacks and setting parameters in the grease injection system and can realize quantitative automatic grease injection and remote wired or wireless control of the grease injection system.

Compared with the related art, in an embodiment of the disclosure, the sealing grease which can be transported remotely is supplied to a device near a wellhead with the host module, and working data of the host module 102 is collected with the control module 101. Moreover, the control module 101 can control the host module to run automatically based on a preset mode, so that automatic grease injection can be realized based on a preset time node, a grease injection pressure node or other control nodes which can be automatically acquired.

On the other hand, in this embodiment, the host module 102 is an integrated host and is connected with a plurality of the devices to be injected with grease 106 through a plurality of the shunting modules 104. That is, the sealing grease supplied by the host module 102 is first remotely transported to one or more shunting modules 104 through the grease injection main pipe 103, and then the shunting branch pipe 105 is led out from the shunting modules 104 to be connected to each of the devices to be injected with grease 106. In this way, the host module 102 can be installed in a safe area away from the wellhead, which has high safety for the device or operator, and since the host module 102 can be away from the wellhead, the total number of devices near the wellhead can be reduced. In this embodiment, the sealing grease is lithium-based sealing grease which is convenient for long-distance transportation, which is more convenient for long-distance automatic grease injection compared with other viscous sealing greases.

In an embodiment of the disclosure, the host module 102 may further comprise a flow control device 1023 to detect a fluid flow of each component in the host module 102 and the shunting module 104 and to control a fluid flow of the grease injection main pipe 103 and each of the shunting branch pipes 105: the flow control device 1023 in this embodiment may comprise one-stage and multi-stage control valves, the control valves are selected as solenoid valve groups for convenience of automatic control, and these solenoid valve groups can be arranged in a sealing grease flow path and a control hydraulic flow path. The host module 102 further comprises an overpressure protection device 1024, which is connected to fluid passages of components in the host module 102 and the shunting module 104: the overpressure protection device 1024 performs automatic pressure relief depending on a signal exceeding a threshold pressure in the fluid passage. In this embodiment, the overpressure protection device 1024 which may be various pressure relief valves is disposed in the sealing grease flow path to facilitate automatic pressure relief: the host module 102 further comprises an emergency cut-off device 1025, which is connected to the components in the host module 102 and/or the shunting module 104: the emergency cut-off device 1025 turns off all or part of the components in the host module 102 depending on a preset abnormal signal, and the emergency cut-off device 1025 turns off all or part of the components in the shunting module 104 depending on a preset abnormal signal. It can be understood that the emergency cut-off device 1025 may be a hydraulic power stop valve, and hydraulic power thereof can be controlled by an overall controller of the host module 102, so as to facilitate emergency cut-off depending on an automatic or manual control signal.

According to the Detailed Description of the disclosure, the shunting module 104 further comprises a multi-way coupling and a plurality of shunting control valves, the multi-way coupling comprises a main pipe coupling and a plurality of branch pipe couplings, wherein the main pipe coupling is connected to the grease injection main pipe 103, and a plurality of the branch pipe couplings are connected to the shunting branch pipes 105: a plurality of the shunting control valves are respectively disposed on the shunting branch pipes 105 to respectively control the flux of the shunting branch pipes 105. Each of the shunting branch pipes 105 is provide with an explosion-proof flowmeter, and the grease injection main pipe 103 is also provided with an explosion-proof flowmeter, so as to transport the fluid flow in the corresponding pipeline to the control module 101.

According to the Detailed Description of the disclosure, the grease injection device 1022 comprises: a grease injection pump configured to pump sealing grease into the grease injection main pipe 103: a booster pump configured to supply pressurized hydraulic oil to the grease injection pressurization device; and a grease injection pressurization device configured to perform grease injection pressurization with the pressurized hydraulic oil as a power source.

According to the Detailed Description of the disclosure, the host module 102 comprises a control hydraulic source, a plurality of control valve groups and a plurality of hydraulic valves: a plurality of the control valve groups are all connected to the control hydraulic source and output a plurality of control hydraulic pipes, a plurality of the control hydraulic pipes are connected to the hydraulic valves respectively, and the control valve groups control the hydraulic valves connected thereto respectively: a plurality of the hydraulic valves are disposed in the grease injection main pipe 103 and a plurality of the shunting branch pipes 105 respectively, and a plurality of the hydraulic valves control the flux of the grease injection main pipe 103 and a plurality of the shunting branch pipes 105.

According to the Detailed Description of the disclosure, the overpressure protection device 1024 comprises a plurality of pressure relief valves, which are respectively connected to grease injection pipelines in the shunting modules 104 and automatically release pressure depending on the signal exceeding the threshold pressure in the pipeline.

According to the Detailed Description of the disclosure, the shunting module 104 further comprises a plurality of high-pressure sealing grease distribution valves, and a grease injection valve of the device to be injected with grease 106 adopts grease injection at two sides separately, and the high-pressure sealing grease distribution valve controls switch of conduction between the shunting branch pipe 105 and grease injection points at two sides of the grease injection valve.

Figure 2:
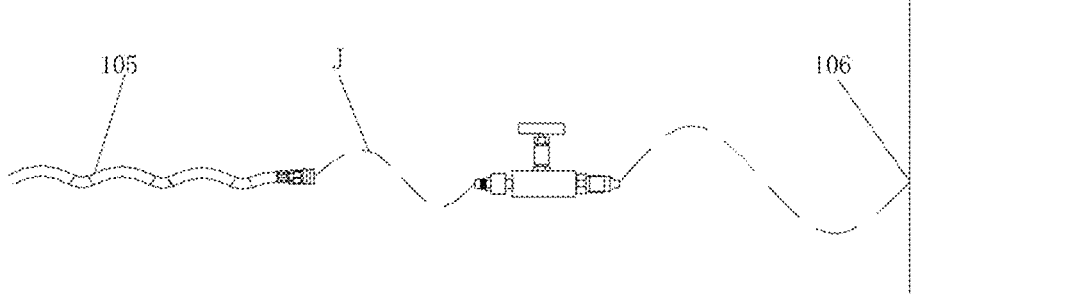
FIG. 2 is a schematic structural diagram of a quick coupling of an automatic grease injection system according to an embodiment of the disclosure.
Figure 3:
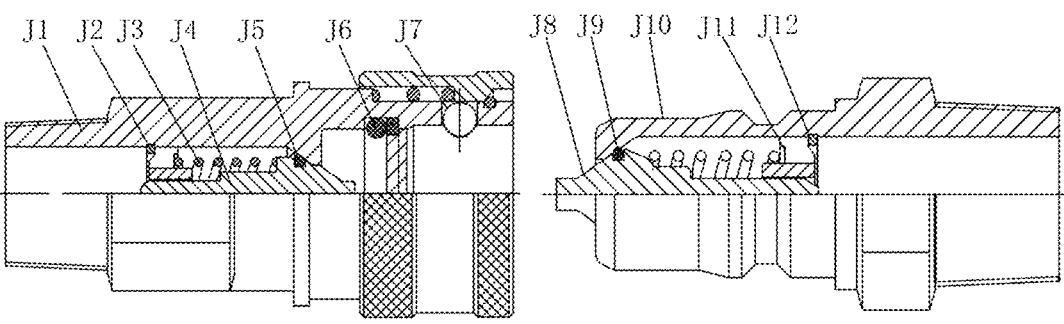
FIG. 3 is a schematic diagram of a cross-sectional structure of a quick coupling mating component of an automatic grease injection system according to an embodiment of the disclosure.

FIG. 2 is a schematic structural diagram of a quick coupling of an automatic grease injection system according to an embodiment of the disclosure. According to the Detailed Description of the disclosure, the shunting module 104 further comprises a plurality of reels configured to respectively receive and release the shunting branch pipes 105, and each of the shunting branch pipes 105 further comprises a quick coupling which is assembled to the grease injection valve of the device to be injected with grease 106. The skid-mounted shunting module can be placed in a corresponding position (in a high-pressure dangerous area) according to a site layout. Each of the shunting modules 104 can be freely assembled with other shunting modules 104 and the host module 102. The pipeline of the shunting branch pipe 105 is received and released by the reel, which can adapt to grease injection connection with devices at different distances. A front section of the shunting branch pipe 105 may be a quick coupling, which can realize quick connection and disassembly with the grease injection valve. The grease injection valve is connected to a grease injection end of a device, which can realize grease injection by line and surface metal sealing and unidirectional flow action and effectively prevent high-pressure fluid leakage in the device. FIG. 3 is a schematic diagram of a cross-sectional structure of a quick coupling mating component of an automatic grease injection system according to an embodiment of the disclosure. External threads of a quick coupling (female) body J1 and a quick coupling (male) body J10 can realize thread sealing with connecting threads of the shunting branch pipe 105. A first movable body J4 is disposed in the cavity of the quick coupling (female) body J1, and a first spring J3 provides the first movable body J4 to press on a quick coupling (female) sealing ring J5, so as to keep a sealed state of the quick coupling (female) body J1 under normal conditions, and the rear end of the first movable body J4 is further provided with a first sealing piece J2 to seal the same. A second movable body J8 is disposed in the cavity of the quick coupling (male) body J10, and a second spring J11 provides the second movable body J8 to press on a quick coupling (male) sealing ring J9, so as to keep a sealed state of the quick coupling (male) body J10 under normal conditions, and the rear end of the second movable body J8 is further provided with a second sealing piece J12 to seal the same. The quick coupling (female) sealing ring J5 and the quick coupling (male) sealing ring J9 can realize self-sealing, that is, when the quick couplings are not connected to each other, the sealing grease will not flow out. Meanwhile, a spring therein can prevent the sealing grease from overflowing during plugging and unplugging of the quick coupling, causing no environmental pollution. A steel ball J7 and the movable bodies of the quick coupling are specially treated, so that the whole quick coupling can bear high pressure and high load. A sealing ring J6 can also keep sealing of a connection between the quick coupling (female) J1 and the quick coupling (male) J10.

The skid-mounted host module 102 in the embodiment of the disclosure can be placed in a safe area of the well site and connected to the shunting module 104 through the reel receiving and releasing pipeline or a quick connection device to inject high-pressure and high-flow sealing grease into the shunting module 104, so that the sealing grease is injected into each device. Since the host module 102 is placed in the safe area of the well site, barreled sealing grease can be quickly replaced at any time after the sealing grease is injected.

Figure 4:
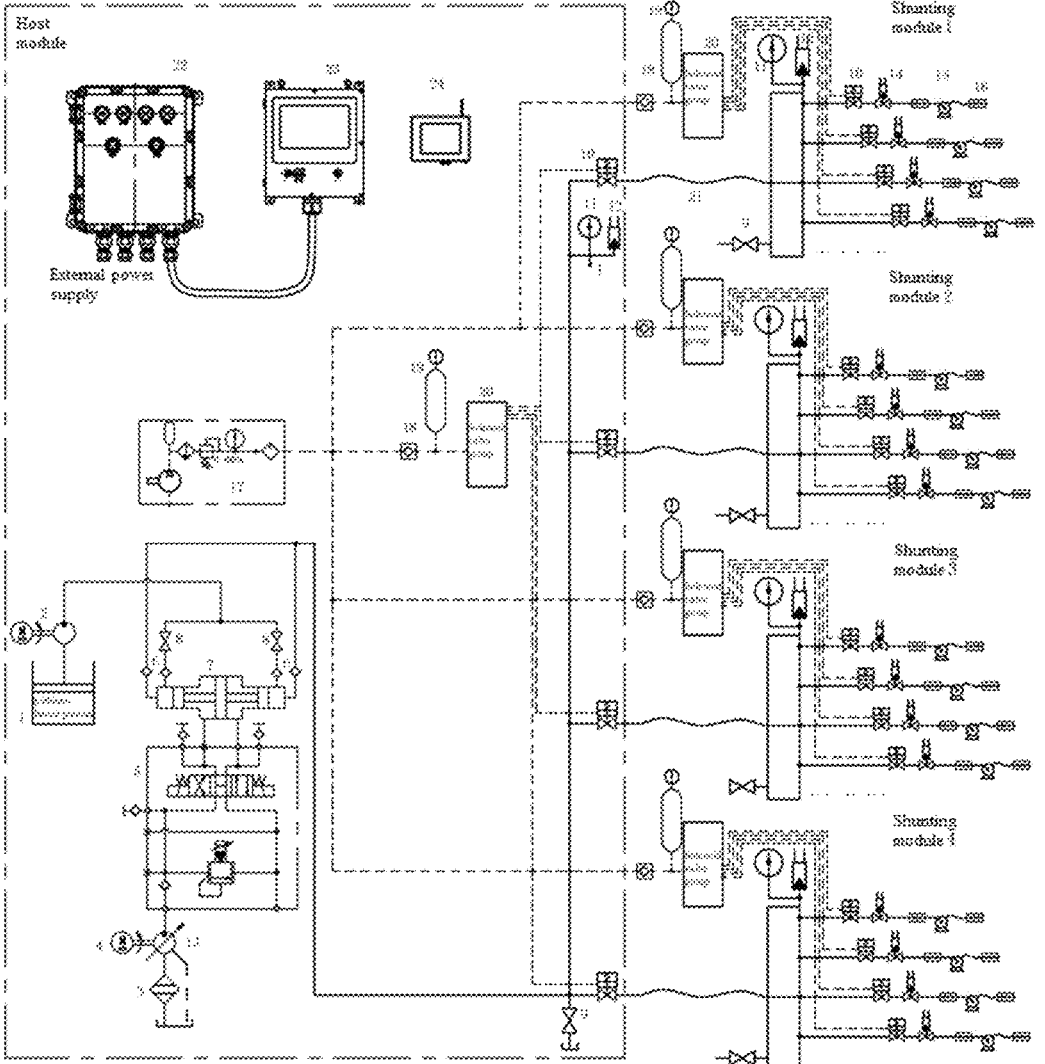
FIG. 4 is a schematic structural diagram of a liquid path system of an automatic grease injection system according to an embodiment of the disclosure.

FIG. 4 is a schematic structural diagram of a liquid path system of an automatic grease injection system according to an embodiment of the disclosure. In the embodiment of the disclosure, taking the two-stage grease injection pump as an example, a specific grease injection method is as follows: the hydraulic oil of the pressurization system is injected into a booster cylinder 7 through a filter 3, a hydraulic pump 4 and a booster cylinder control valve group 5, and an automatic control part of the pressurization system realizes a recipro-cating motion of a piston in the booster cylinder 7. A low-pressure grease injection pump 2 injects the filtered sealing grease into the booster cylinder 7 via a stop valve 8 and a check valve 6, and quickly injects the pressurized sealing grease into the shunting device 104 via the check valve through the reciprocating motion of the booster cyl-inder 7, connection and disconnection of the shunting devices and oil lines are controlled by controlling a solenoid valve group 20. A sealing grease container 1 provides sealing grease for the system. An explosion-proof flowmeter 11 can be installed on the branch pipelines or the main pipeline, feed the grease injection amount back to the control system in real time and display the same to an operator. When the grease injection amount reaches a set value, the system will automatically stop or continue grease injection in the next oil line. The shunting module 104 can form a skid alone, and each of the shunting modules 104 comprises a stop valve 10, a shunting solenoid valve 14, a reel 15, various coupling switches 16 and the like, wherein the stop valve 10 can realize om-off control of each branch pipeline, and a plurality of shunting modules can be configured based on different well site layouts and different device numbers. Each of the shunting modules can be equipped with a plurality of reels and oil outlets to quickly inject grease into different devices respectively. Simultaneously, the oil line is equipped with a pressure relief valve 9, and when pressure of the oil line exceeds a limit value, the pressure relief valve 9 automatically relieves the pressure. In an embodiment, a safety pressure relief valve 12 is equipped in front of the stop valve 10, so as to provide pressure relief protection when an overpressure signal is obtained.

On the other hand, the control module 101 in the hardware system of the disclosure mainly comprises a power supply module 22, a general controller 23 and a communication module 24. A signal of the general controller 23 facilitates connection to the power, detector, and control valves in the pressurization system so as to obtain state signals of the power, detector, and control valves in the pressurization system in real time, and control signals are output accord-ingly for automatic control. The general controller 23 may be an intelligent computing device such as a computer terminal or a PLC programmable controller.

Compared with the related art, the disclosure has the following beneficial effects: provided is a remote automatic grease injection module system capable of realizing quick connection, which is mainly composed of three modules: the host module 102, the shunting module 104 and the control module 101, and the system can realize modular assembly. The host module 102 can output high-pressure and large-displacement sealing grease through the grease injection device 1022 and the power device 1021, and can realize functions of flow monitoring, overpressure protection, emer-gency cut-off and the like of the sealing grease: wherein the grease injection device 1022 may be a one-stage grease injection pump, a two-stage grease injection pump or even a multi-stage grease injection pump, and the grease injection pump may be a pneumatic grease injection pump, a hydrau-lic grease injection pump, an electric grease injection pump and the like, all of which can output the high-pressure and large-displacement sealing grease. The shunting module 104 comprises a reel, various coupling switches, electromagnetic valves, and the like. A plurality of shunting modules 104 are disposed based on different well site layout and different device number, and each of the shunting modules 104 can be provided with a plurality of oil outlets to quickly inject grease into different devices respectively: each of the shunt-ing modules 104 can be freely assembled with other shunt-ing modules 104 and the host module 102 or can be used alone: a connection means of each oil outlet is a quick connection device, which can realize quick connection and disassembly with a device. The control module 101 can realize quantitative automatic grease injection and remote wired or wireless control depending upon device situations at site.

Figure 5:
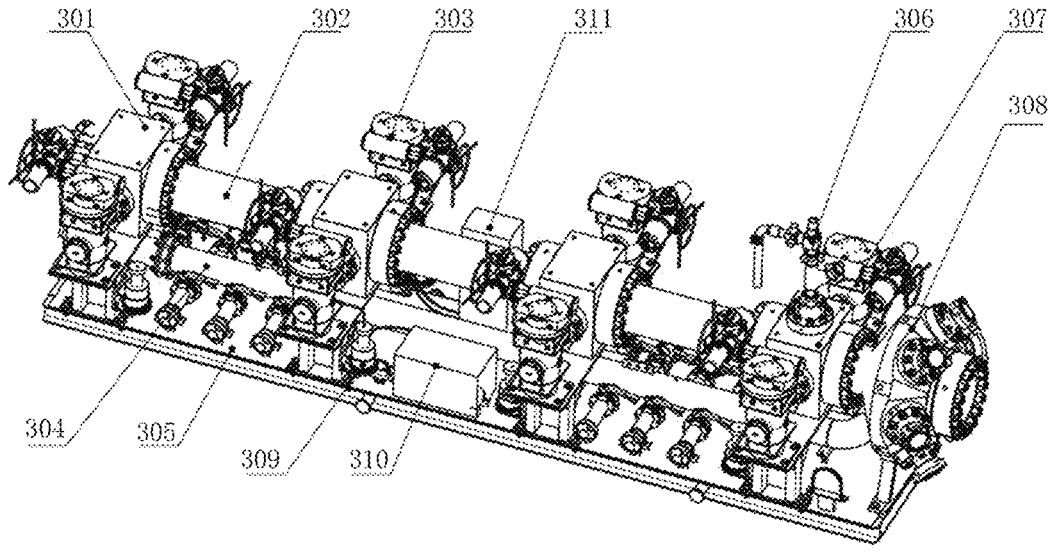
FIG. 5 is a schematic diagram of a three-dimensional structure of a manifold device for automatic grease injection according to an embodiment of the disclosure.
Figure 6:
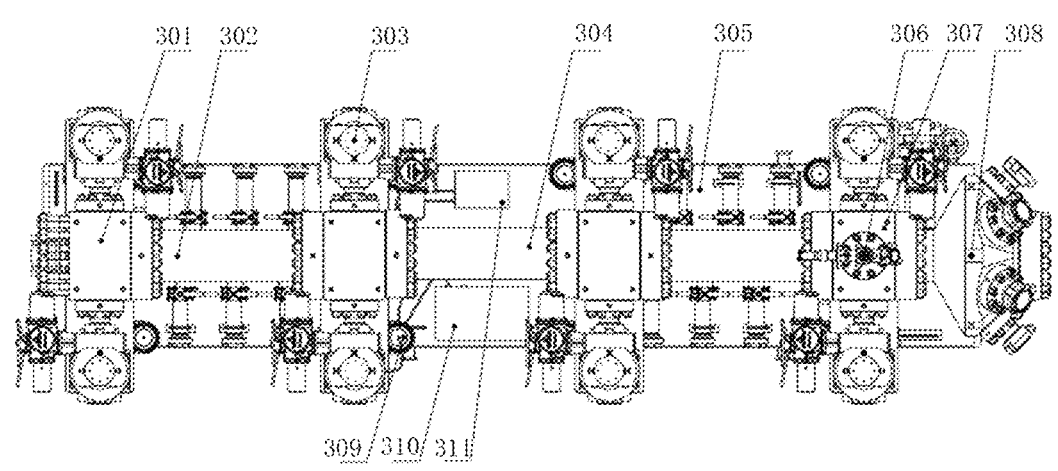
FIG. 6 is a schematic top structural diagram of a manifold device for automatic grease injection according to an embodiment of the disclosure.

FIG. 5 is a schematic top structural diagram of a manifold device for automatic grease injection according to an embodiment of the disclosure, and FIG. 6 is a schematic top structural diagram of a manifold device for automatic grease injection according to an embodiment of the disclosure. In a second aspect, the disclosure relates to an automatic grease injection system, which comprises a hydraulic power source assembly configured to output grease injection power hydraulic oil and a plurality of the grease injection devices 1022: the hydraulic power source assembly drives a plurality of the grease injection devices 1022 to separately output sealing grease: the control module 101 is signally connected to the hydraulic power source assembly and a plurality of the grease injection devices 1022 to receive state signals of the hydraulic power source assembly and a plurality of the grease injection devices 1022 and to output control signals to the hydraulic power source assembly and a plurality of the grease injection devices 1022.

In this embodiment, the sealing grease with higher viscosity is automatically injected. The sealing grease in this embodiment is not suitable for long-distance transportation due to higher viscosity, so the grease injection device in this embodiment is integrated with the device to be injected with grease.

The manifold device for automatic grease injection in this embodiment can be understood as a high and low pressure manifold skid, and the whole high and low pressure manifold skid adopts an arrangement manner that a low pressure manifold assembly is in a lower part and a high pressure manifold assembly is in an upper part, which facilitates maintenance inspection of high pressure components. A low pressure manifold assembly 304 is installed on a skid frame assembly 305 through a support and is configured to transport low-pressure fracturing fluid output by a sand blender to a suction end of a fracturing pump truck. Via a flanged straight pipe 302, two adjacent crosses 301 are connected, and two adjacent cross 301 and five-port 307 are connected. Two sides of the cross 301 and the five-port 307 are connected with electric valves 303 which is configured to collect and transport high-pressure fracturing fluid pressurized by the pump truck to the manifold device at the wellhead and meanwhile pass a switch of the electric valve 303, realizing flow control of the high-pressure fracturing fluid in the corresponding branch pipeline. A safety valve assembly 306 is configured to control pressure of the high-pressure fracturing fluid, and will overflow and relieve pressure through the safety valve when the pressure exceeds a set value, thus ensuring smooth progress of the whole fracturing operation. A fracturing head assembly 308 is configured to shunt the high-pressure fracturing fluid to a wellhead device.

A grease injection system 309 mainly comprises: a hydraulic power source, a grease injection booster cylinder, a grease injection booster cylinder control valve, a high-pressure sealing grease distribution solenoid valve, a valve, and related transportation pipelines, transition couplings and the like.

Key features of the components are as follows:
a hydraulic power source assembly 310 provides power for a grease injection oil cylinder, comprises a power source (such as electric motor, internal combustion engine, hydraulic motor and pneumatic motor), a hydraulic pump, a hydraulic oil tank, a check valve, an unloading valve, an overflow valve, an oil suction filter, an oil return filter and the like, and can output two or more different flows based on different load pressures under the premise of constant rotation speed of the power source. That is, under high-voltage load, small flow is output: under low-voltage load, large flow is output.

The grease injection booster cylinder pressurizes sealing grease and injects the sealing grease into a valve grease injection point whose structure is divided into a low-pressure part and a high-pressure part. The low-pressure part is connected to a control valve oil port, and the control valve can control reciprocating motion of a plunger inside the oil cylinder; the high-pressure part is filled with sealing grease which is pressurized by the plunger inside the oil cylinder in a fixed proportion and then injected into the valve, and the maximum pressure of the pressurized sealing grease can reach 15000 psi.

The grease injection booster cylinder control valve is an electromagnetic reversing valve that controls the reciprocating motion of the plunger inside the booster cylinder, which can be electronically reversed or manually reversed to open a spool, that is, when a reversing valve spool is in a middle position, a multi-way valve can empty pressure of the power source to the hydraulic oil tank, thus reducing system heating.

The high-pressure sealing grease distribution valve: when grease is injected on both sides of the valve, switch of conduction between the high-pressure sealing grease transportation pipeline and the grease injection points on both sides of the valve is controlled.

Figure 7:
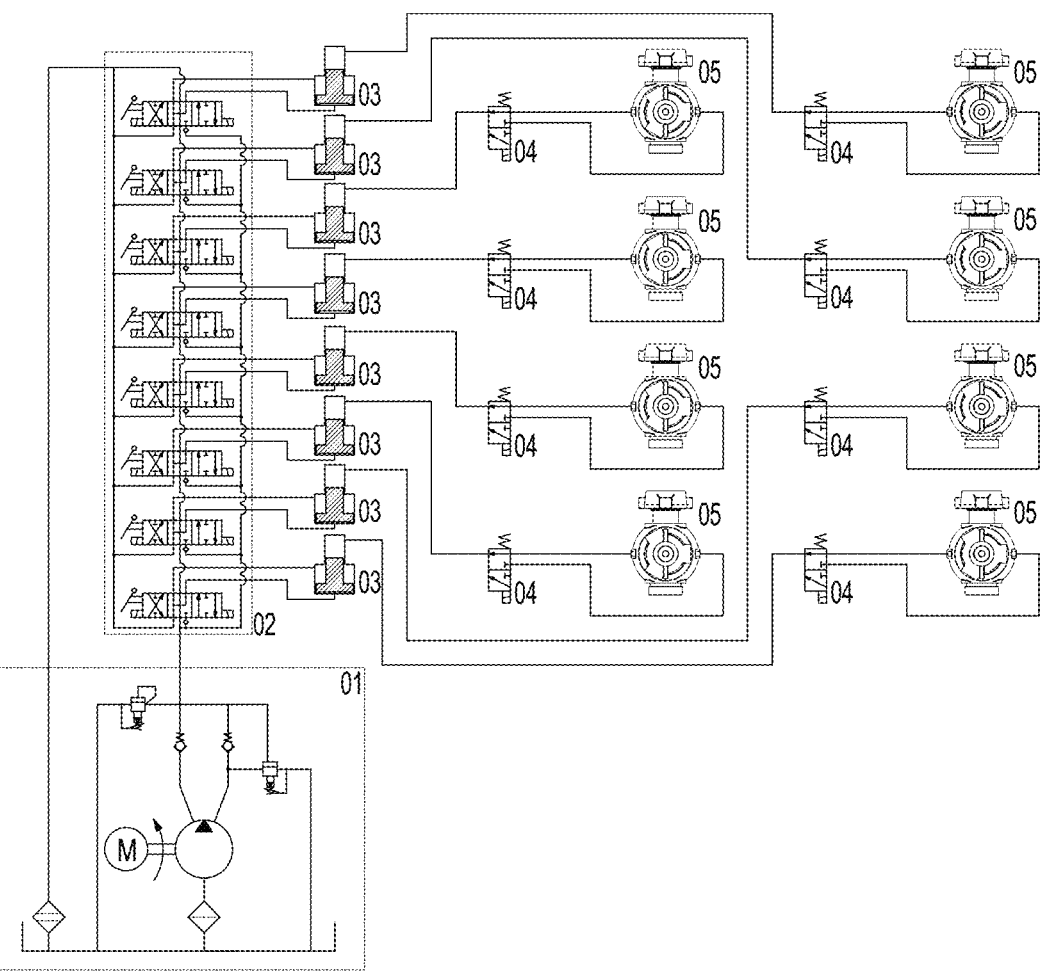
FIG. 7 is a first schematic structural diagram of a hydraulic system of a manifold device for automatic grease injection according to an embodiment of the disclosure.

FIG. 7 is a first schematic structural diagram of a hydraulic system of a manifold device for automatic grease injection according to an embodiment of the disclosure, wherein the grease injection device mainly comprises a hydraulic power source 01, a booster cylinder control valve 02, a grease injection booster cylinder 03, a sealing grease distribution valve 04 and a valve 05. A grease injection process in which the grease injection system in FIG. 7 may be a hydraulic control circuit that injects grease with eight valves comprises: a high-pressure part of the grease injection booster cylinder 03 is filled with sealing grease, the hydraulic power source 01 is started, one solenoid valve in the booster cylinder control valve 02 is energized, hydraulic oil output by the solenoid valve pushes a plunger inside the grease injection booster cylinder 03 to move and squeeze the sealing grease, the pressurized sealing grease enters a grease injection point on one side of the valve 05 via the sealing grease distribution valve 04, after grease is fully injected into the grease injection point, the sealing grease distribution valve 04 is reversed, so that the high-pressure sealing grease is injected into a grease injection point on the other side of the valve, and after grease is fully injected into the grease injection point on the other side, the valve completes the grease injection process, and grease injection of other valves is alike.

Figure 8:
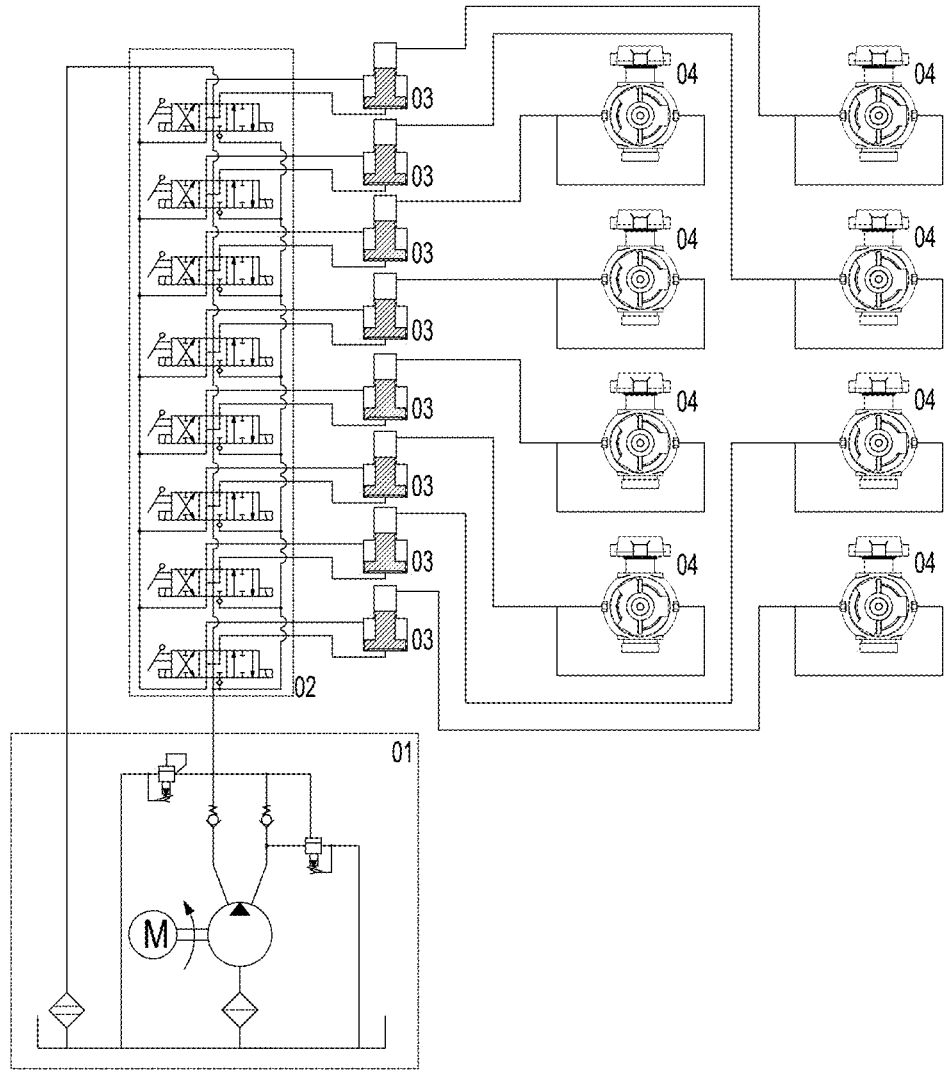
FIG. 8 is a second schematic structural diagram of a hydraulic system of a manifold device for automatic grease injection according to an embodiment of the disclosure.

FIG. 8 is a second schematic structural diagram of a hydraulic system of a manifold device for automatic grease injection according to an embodiment of the disclosure, wherein the grease injection device mainly comprises a hydraulic power source 01, a booster cylinder control valve 02, a grease injection booster cylinder 03 and a valve 04. A grease injection process in which the grease injection system in FIG. 8 may be a hydraulic control circuit that injects grease with eight valves comprises: the hydraulic power source 01 is started, part of the grease injection booster cylinder 03 is filled with sealing grease, one solenoid valve in the booster cylinder control valve 02 is energized, hydraulic oil output by the solenoid valve pushes a plunger inside the booster cylinder to move and squeeze the sealing grease, the pressurized sealing grease meanwhile enters grease injection points on both sides of the corresponding valve, grease is injected on both sides for 5 to 10 s, and then the valve is opened and closed once: again grease is injected on both sides of the valve for 5 to 10 s, the valve is opened and closed for the second time; and grease is injected on both sides of the valve for the third time for 5 to 10 until grease is fully injected on both sides of the valve. At this point, the valve completes the grease injection process, and grease injection of other valves is alike.

According to the Detailed Description of the disclosure, the automatic grease injection system and the fracturing manifold form a skid together, and a plurality of the grease injection devices are butted against a plurality of the devices to be injected with grease on the fracturing manifold respectively. According to the Detailed Description of the disclosure, the fracturing manifold comprises a low-pressure manifold and a high-pressure manifold, both of which are installed on a skid frame assembly through a support, and the low-pressure manifold is configured to transport low-pressure fracturing fluid to a suction end of a fracturing pump truck; the high-pressure manifold is configured to control high-pressure fracturing fluid.

According to the Detailed Description of the disclosure, the control module 101 is installed on the skid frame assembly and integrated with a control unit of the fracturing manifold. In accordance with an intelligent topology manifold process of a manifold skid layout system, a control system assembly 311 sends instructions as needed to form a one-key process switch and a state feedback real-time indication, and meanwhile, the process forms and sends linkage instructions to related devices to form linkage interlocking, thus providing safety of device operation; at the same time, the system forms whole life-cycle management and views manifold related data and service time in real time, which effectively reduces overload service risk of the manifold and realizes statistical analysis and service life management of the high-pressure manifold. (A control software is integrated with a control software of a fracturing pump truck on a measuring truck to form a program control logical relationship of opening an electric valve first and then operating the fracturing pump truck; stopping the fracturing pump truck first and then closing the electric valve, avoiding misoperation, and ensuring the device safety and smooth progress of construction.) After receiving switching instructions, a local control system controls action of the electric valve. When the valve is switched to a specified position, a sensor sends a signal to a local control box, and a control element in the local control box sends instructions and meanwhile operates an interface to display that the valve is switched in place. An on/off state of the electric valve is displayed on a computer operation interface in the measuring truck and a local control box operation interface, which can control the on/off of a single or multiple electric valves at the same time.

Local control system: the local control system can be directly operated by buttons on a touch screen operation interface of the local control box, forming control redundancy.

Remote control system: a remote control system can be used during fracturing construction and when the manifold is under no pressure. An operator gives operation instructions at an operation terminal of a control center, and signals can form links with local control in various bus forms (modbus, profinet, canOpen) and various wireless forms (WiFi, lora, zigbee, etc.), so as to remotely control on/off of the valve. At the same time, a signal of the valve on/off state is fed back to the remote terminal and displayed on the remote terminal. It avoids personnel entering a high-pressure area and reduces labor intensity of personnel.

A grease injection amount of the valve can be intermittently injected according to working time of a device, and injection of a continuous and reliable grease amount can also be realized as needed.

An intelligent remote control automatic grease injection high and low pressure manifold skid can be used in a single set or in combination and connection of multiple sets.

In a third aspect, the disclosure relates to an exploitation system comprising the automatic grease injection system.

The disclosure relates to a remote automatic grease injection module system which can realize quick connection. A skid-mounted shunting module can be placed in a corresponding position (in a high-pressure dangerous area) according to a site layout. A pipeline is received and released by a reel, which can adapt to grease injection connection with devices at different distances. A skid-mounted host module is placed in a safe area of a well site and connected to the shunting modules through a reel receiving and releasing pipeline and a quick connection device. Each of the shunting modules can be freely assembled with other shunting modules and a host module, or can be used alone to adapt to various well site layouts. A front section of the oil pipe may be a quick coupling, which can realize quick connection and disassembly with the grease injection valve. The grease injection valve is connected to a grease injection end of a device, which can realize grease injection by line and surface metal sealing and unidirectional flow action and effectively prevent high-pressure fluid leakage in the device. When the well site is arranged, the above layout and corresponding connection can be completed. During maintenance at an operation interval, it is not necessary to connect the grease injection pipelines, but only necessary to operate the control system at the position of the host module to inject grease, which greatly shortens maintenance time.

The disclosure relates to a remote automatic grease injection module system which can realize quick connection. The sealing grease is increased to a high pressure state, high-pressure and high-flow sealing grease is injected into the shunting module and thus injected into each device. The host module is placed in the safe area of the well site, which guarantees safety of an operator, and the sealing grease can be quickly replaced after being injected.

Based on site layout, a plurality of skid-mounted shunting modules can be disposed, and each of the shunting modules can be provided with a plurality of reels and oil outlets, so as to quickly inject grease into different devices respectively. It is not necessary for an operator to drag a grease injection tool to inject grease into each device separately, which greatly reduces labor intensity of personnel.

The automatic grease injection system of the disclose can reach a pressure of 70 MPa to 150 MPa and a flow of 1 L/min to 20 L/min, which can realize fast grease injection with a high pressure and a large flow.

The disclosure can realize pressure monitoring, real-time display of pressure in a pipeline, and automatic pressure relief protection in case of overpressure.

According to the disclosure, the flow can be monitored by a high-pressure flowmeter, and a quantitative automatic grease injection function can be realized.

According to the disclosure, functions of remote operation control and signal feedback can be realized.

A high-pressure hose in the disclosure is equipped with a reel which can adapt to site layout for different distance requirements.

The disclosure applies to high-viscosity sealing grease and can realize high-pressure and large-flow grease injection.

It should be noted that relationship terms such as "first" and "second" are used solely for distinguishing one entity or operation from another entity or operation herein without necessarily requiring or implying any actual relationship or order among the entities or operations. Furthermore, the terms "comprise", "comprising", or any other variants thereof are intended to encompass non-exclusive inclusion, so that a process, method, article, or device comprising a series of elements not only comprises those elements but further comprises other elements not expressly listed or elements inherent to such a process, method, article, or device. Without more limitations, an element defined by a phrase "comprise a . . . " does not exclude the presence of additional identical elements in the process, method, article, or device that includes the element.

The foregoing description is only the Detailed Description of the disclosure to enable a person skilled in the art to understand or implement the disclosure. Various modifications to these embodiments will be apparent to a person skilled in the art, and general principles defined herein may be implemented in other embodiments without departing from the spirit or scope of the disclosure. Thus, the disclosure is not limited to the embodiments shown herein, but conforms to the widest scope consistent with the principles and novel characteristics applied herein.

What is claimed is:

1. An automatic grease injection system comprising:
a host structure comprising a power structure and a grease injection structure, in which the power structure drives the grease injection structure to output sealing grease;
a shunting structure comprising a control valve and a connecting pipeline which comprises a plurality of shunting branch pipes and a grease injection main pipe which are connected to each other, in which the grease injection main pipe is connected to the grease injection structure, each of the shunting branch pipes is connected to a structure to be injected with grease, and the sealing grease output by the host structure is selectively connected to the structure to be injected with grease through the shunting structure; and
a controller signally connected to the host structure and the shunting structure to receive state signals of the host structure and the shunting structure and to output control signals to the host structure and the shunting structure,
wherein the shunting structure further comprises a multi-way coupling and a plurality of shunting control valves, the multi-way coupling comprises a main pipe coupling and a plurality of branch pipe couplings, the main pipe coupling is connected to the grease injection main pipe, and the plurality of the branch pipe couplings are connected to the shunting branch pipes; the plurality of the shunting control valves are respectively disposed on the shunting branch pipes to respectively control a flux of the shunting branch pipes.

2. The automatic grease injection system according to claim 1, wherein the host structure further comprises a flow controller to detect fluid flow of components in the host structure and the shunting structure and to control fluid flow of the grease injection main pipe and each of the shunting branch pipes; and/or
the host structure further comprises an overpressure protector which is connected to fluid passages of the components in the host structure and the shunting structure; the overpressure protector performs automatic pressure relief according to a signal exceeding a threshold pressure in a fluid passage; and/or the host structure further comprises an emergency cut-off structure which is connected to the components in the host structure and/or the shunting structure; the emergency cut-off structure turns off all or part of the components in the host structure according to a preset abnormal signal, and/or the emergency cut-off structure turns off all or part of the components in the shunting structure according to a preset abnormal signal.

3. The automatic grease injection system according to claim 1, wherein the shunting structure further comprises a plurality of reels configured to respectively receive and release the shunting branch pipes, and each of the shunting branch pipes further comprises a quick coupling which is assembled to a grease injection valve of the structure to be injected with grease.

4. The automatic grease injection system according to claim 1, wherein each of the shunting branch pipes is provided with an explosion-proof flowmeter, and the grease injection main pipe is provided with an explosion-proof flowmeter, so as to transport fluid flow in a corresponding pipeline to the controller.

5. The automatic grease injection system according to claim 1, wherein the grease injection structure comprises: a grease injection pump configured to pump sealing grease into the grease injection main pipe; a booster pump configured to supply pressurized hydraulic oil to a grease injection pressurization structure; and the grease injection pressurization structure configured to perform grease injection pressurization with the pressurized hydraulic oil as a power source.

6. The automatic grease injection system according to claim 1, wherein the host structure comprises a control hydraulic source, a plurality of control valve groups and a plurality of hydraulic valves; a plurality of the control valve groups are all connected to the control hydraulic source and output a plurality of control hydraulic pipes, a plurality of the control hydraulic pipes are respectively connected to the hydraulic valves, and the control valve groups respectively control the hydraulic valves connected thereto; a plurality of the hydraulic valves are respectively disposed in the grease injection main pipe and a plurality of the shunting branch pipes, and a plurality of the hydraulic valves control a flux of the grease injection main pipe and a plurality of the shunting branch pipes.

7. The automatic grease injection system according to claim 2, wherein the overpressure protector comprises a plurality of pressure relief valves, each of which is connected to a grease injection pipeline in each of the shunting structures and automatically releases pressure according to a signal exceeding a threshold pressure in the pipeline.

8. The automatic grease injection system according to claim 1, wherein the shunting structure further comprises a plurality of high-pressure sealing grease distribution valves, and a grease injection valve of the structure to be injected with grease adopts grease injection at two sides separately, and the high-pressure sealing grease distribution valve controls switching of conduction between the shunting branch pipe and grease injection points at two sides of the grease injection valve.

9. An automatic grease injection system comprising:
a hydraulic power source assembly configured to output grease injection power hydraulic oil;
a plurality of grease injection structures driven by the hydraulic power source assembly to separately output sealing grease; and
a controller signally connected to the hydraulic power source assembly and the plurality of the grease injection structures to receive state signals of the hydraulic power source assembly and the plurality of the grease injection structures and to output control signals to the hydraulic power source assembly and the plurality of the grease injection structures, wherein the automatic grease injection system and a fracturing manifold form a skid together, and the plurality of the grease injection structures are butted against a plurality of structures to be injected with grease on the fracturing manifold respectively.

10. The automatic grease injection system according to claim 9, wherein the fracturing manifold comprises a low-pressure manifold and a high-pressure manifold, both of which are installed on a skid frame assembly through a support, and the low-pressure manifold is configured to transport low-pressure fracturing fluid to a suction end of a fracturing pump truck; the high-pressure manifold is configured to control high-pressure fracturing fluid.

11. The automatic grease injection system according to claim 10, wherein the controller is installed on the skid frame assembly and integrated with a control unit of the fracturing manifold.

12. An exploitation system comprising the automatic grease injection system according to claim 1.

13. An automatic grease injection system comprising:

a host structure comprising a power structure and a grease injection structure, in which the power structure drives the grease injection structure to output sealing grease;

a shunting structure comprising a control valve and a connecting pipeline which comprises a plurality of shunting branch pipes and a grease injection main pipe which are connected to each other, in which the grease injection main pipe is connected to the grease injection structure, each of the shunting branch pipes is connected to a structure to be injected with grease, and the sealing grease output by the host structure is selectively connected to the structure to be injected with grease through the shunting structure; and a controller signally connected to the host structure and the shunting structure to receive state signals of the host structure and the shunting structure and to output control signals to the host structure and the shunting structure, wherein the grease injection structure comprises: a grease injection pump configured to pump sealing grease into the grease injection main pipe; a booster pump configured to supply pressurized hydraulic oil to a grease injection pressurization structure; and the grease injection pressurization structure configured to perform grease injection pressurization with the pressurized hydraulic oil as a power source.

14. The automatic grease injection system according to claim 13, wherein the host structure further comprises a flow controller to detect fluid flow of components in the host structure and the shunting structure and to control fluid flow of the grease injection main pipe and each of the shunting branch pipes; and/or the host structure further comprises an overpressure protector which is connected to fluid passages of the components in the host structure and the shunting structure; the overpressure protector performs automatic pressure relief according to a signal exceeding a threshold pressure in a fluid passage; and/or the host structure further comprises an emergency cut-off structure which is connected to the components in the host structure and/or the shunting structure; the emergency cut-off structure turns off all or part of the components in the host structure according to a preset abnormal signal, and/or the emergency cut-off structure turns off all or part of the components in the shunting structure according to a preset abnormal signal.

15. The automatic grease injection system according to claim 13, wherein the shunting structure further comprises a multi-way coupling and a plurality of shunting control valves, the multi-way coupling comprises a main pipe coupling and a plurality of branch pipe couplings, the main pipe coupling is connected to the grease injection main pipe, and a plurality of the branch pipe couplings are connected to the shunting branch pipes; a plurality of the shunting control valves are respectively disposed on the shunting branch pipes to respectively control a flux of the shunting branch pipes.

16. The automatic grease injection system according to claim 13, wherein the shunting structure further comprises a plurality of reels configured to respectively receive and release the shunting branch pipes, and each of the shunting branch pipes further comprises a quick coupling which is assembled to a grease injection valve of the structure to be injected with grease.

17. The automatic grease injection system according to claim 13, wherein each of the shunting branch pipes is provided with an explosion-proof flowmeter, and the grease injection main pipe is provided with an explosion-proof flowmeter, so as to transport fluid flow in a corresponding pipeline to the controller.

18. The automatic grease injection system according to claim 13, wherein the shunting structure further comprises a plurality of high-pressure sealing grease distribution valves, and a grease injection valve of the structure to be injected with grease adopts grease injection at two sides separately, and the high-pressure sealing grease distribution valve controls switching of conduction between the shunting branch pipe and grease injection points at two sides of the grease injection valve.

* * * * *